(12) United States Patent
Ueda et al.

(10) Patent No.: US 9,077,945 B2
(45) Date of Patent: Jul. 7, 2015

(54) IMAGE PROCESSING DEVICE, IMAGE PROCESSING METHOD, AND PROGRAM WHICH CORRECTLY AND EASILY EXTRACTS A COLOR REGION OF A SPECIFIC COLOR

(75) Inventors: Atsushi Ueda, Tokyo (JP); Jun Minakuti, Tokyo (JP); Daisuke Satou, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 532 days.

(21) Appl. No.: 13/340,068

(22) Filed: Dec. 29, 2011

(65) Prior Publication Data

US 2012/0218439 A1  Aug. 30, 2012

(30) Foreign Application Priority Data

Feb. 28, 2011 (JP) ................. 2011-041725

(51) Int. Cl.
*H04N 9/73* (2006.01)
(52) U.S. Cl.
CPC ..................... *H04N 9/735* (2013.01)
(58) Field of Classification Search
CPC ......... H04N 9/735; H04N 9/73; H04N 9/045; H04N 5/235; H04N 5/2352; H04N 1/6086; H04N 1/6027; G06T 5/001
See application file for complete search history.

(56) References Cited

U.S. PATENT DOCUMENTS

| | | | |
|---|---|---|---|
| 4,797,733 A | 1/1989 | Takagi et al. | |
| 4,954,884 A * | 9/1990 | Nakayama et al. | ........ 348/225.1 |
| 5,361,093 A | 11/1994 | Yamamoto et al. | |
| 6,094,220 A | 7/2000 | Nakano et al. | |
| 6,963,362 B1 | 11/2005 | Nakayama | |
| 8,416,316 B2 * | 4/2013 | Park et al. | .................. 348/223.1 |
| 2003/0169348 A1 | 9/2003 | Ikeda et al. | |
| 2005/0052546 A1* | 3/2005 | Nakabayashi et al. | ..... 348/223.1 |
| 2005/0259160 A1 | 11/2005 | Une | |

(Continued)

FOREIGN PATENT DOCUMENTS

| | | |
|---|---|---|
| EP | 0 530 738 A2 | 3/1993 |
| EP | 1 599 052 A2 | 11/2005 |

(Continued)

OTHER PUBLICATIONS

Extended European Search Report issued Jun. 1, 2012 in European Patent Application No. 12156186.4.

(Continued)

*Primary Examiner* — Luong T Nguyen
(74) *Attorney, Agent, or Firm* — Oblon, McClelland, Maier & Neustadt, L.L.P.

(57) ABSTRACT

An image processing device includes a color temperature estimating unit configured to estimate a color temperature of a light source in imaging, a white balance adjusting unit configured to perform first white balance adjustment in which white balance of an image signal is adjusted on the basis of the estimated color temperature when the estimated color temperature is within a predetermined color temperature range, and perform second white balance adjustment in which the white balance of the image signal is adjusted on the basis of the estimated color temperature even when the estimated color temperature is not within the predetermined color temperature range, and a color region extracting unit configured to extract a color region of a specific color by using the image signal to which the second white balance adjustment is applied.

26 Claims, 6 Drawing Sheets

(56) References Cited

U.S. PATENT DOCUMENTS

| | | |
|---|---|---|
| 2009/0002518 A1 | 1/2009 | Nakamura |
| 2009/0009525 A1 | 1/2009 | Hirashima et al. |
| 2010/0020193 A1* | 1/2010 | Zhang et al. ............... 348/223.1 |
| 2011/0205389 A1* | 8/2011 | Zhang ....................... 348/223.1 |

FOREIGN PATENT DOCUMENTS

| | | |
|---|---|---|
| EP | 1 819 143 A1 | 8/2007 |
| JP | 2-29191 | 1/1990 |
| JP | 4-170888 | 6/1992 |
| JP | 5-41830 | 2/1993 |
| JP | 9-215001 | 8/1997 |
| JP | 2003-216941 | 7/2003 |
| JP | 2004-40462 | 2/2004 |
| JP | 2004-198715 | 7/2004 |
| JP | 2005-333433 | 12/2005 |
| JP | 2007-124316 | 5/2007 |
| JP | 2009-55077 | 3/2009 |
| JP | 2009-170966 | 7/2009 |
| JP | 2009-302700 | 12/2009 |

OTHER PUBLICATIONS

Office Action issued on Nov. 26, 2014 in Japanese Application No. 2011-041725 (3 pages).

Office Action issued on Dec. 31, 2014, in Japanese Application No. 201210041097.1. With English translation (16 pages).

Office Action issued on Apr. 28, 2015 in Japanese Application No. 2011-041725 (7 pages).

\* cited by examiner

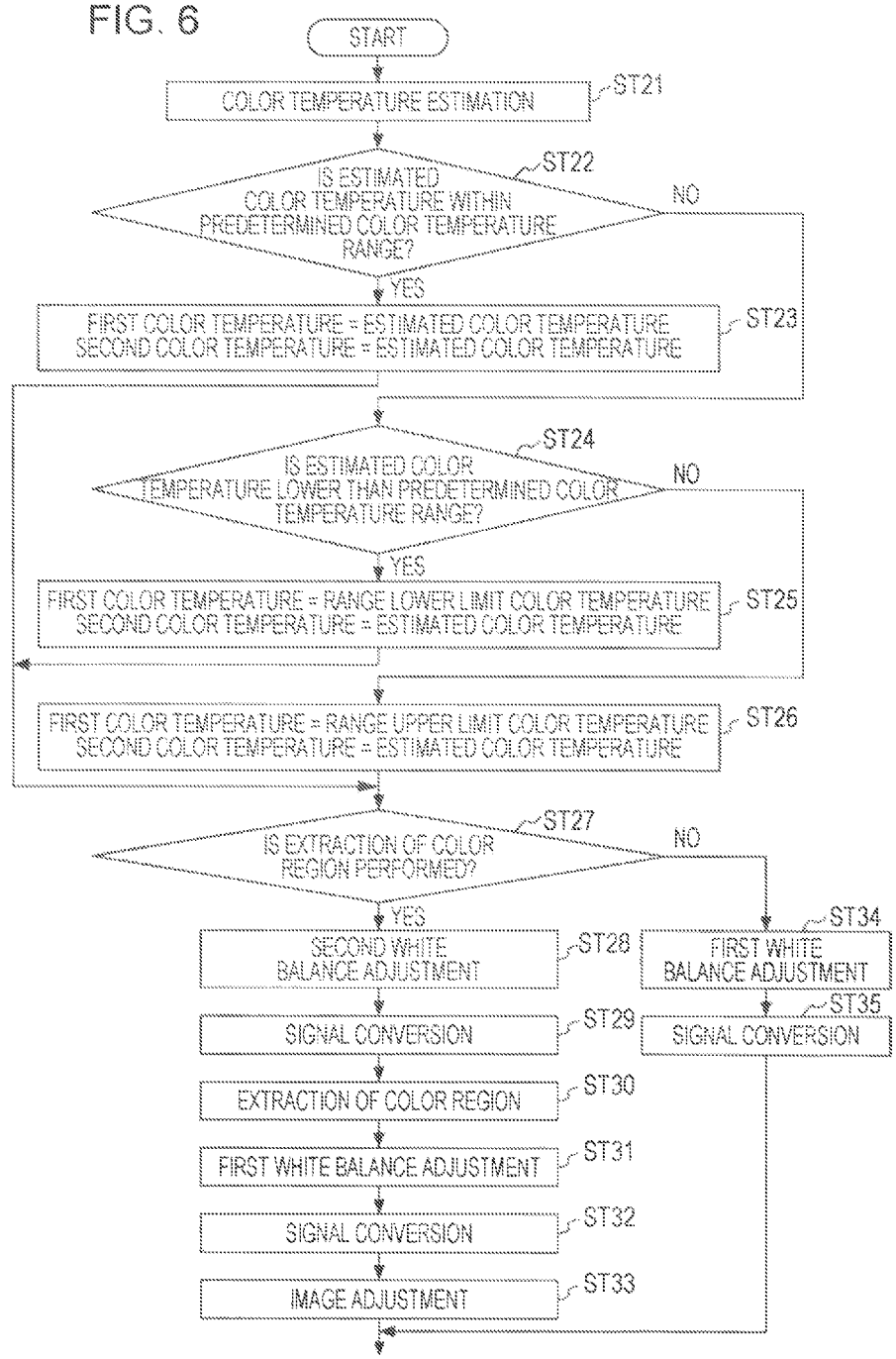

IMAGE PROCESSING DEVICE, IMAGE PROCESSING METHOD, AND PROGRAM WHICH CORRECTLY AND EASILY EXTRACTS A COLOR REGION OF A SPECIFIC COLOR

BACKGROUND

The present technology relates to an image processing device, an image processing method, and a program. Particularly, the present technology relates to a technology to correctly and easily extract a color region of a specific color.

In related art, when a color region of a specific color is extracted from a picked-up image, the color region of the specific color may not be correctly extracted due to an effect of a light source. In a case where a color region of yellow or red is extracted from a picked-up image obtained by imaging under a low color temperature light source such as a tungsten lamp, for example, an achromatic region becomes an extracted object due to an effect of the light source. Therefore, in Japanese Unexamined Patent Application Publication No. 2009-170966, when a color region of a specific color is detected, threshold values of a luminance signal and a color signal in detecting the specific color are changed depending on color temperature information.

Further, a white balance adjusting mechanism is provided to an imaging apparatus and the like so as to correct an effect of a light source. Therefore, in Japanese Unexamined Patent Application Publication No. 2005-333433, when image processing is applied to a color region of a specific color, a color region corresponding to designation from the outside is changed in accordance with change of a white point by white balance adjustment.

SUMMARY

Here, in a case where threshold values of a luminance signal and a color signal in detecting a specific color are changed depending on color temperature information, changing information which shows how the threshold values are changed based on the color temperature information or a threshold value for every color temperature has to be prepared in advance. Further, in a case where a color region is changed in accordance with change of a white point by white balance adjustment, as well, changing information which shows how a color region is changed in accordance with the change of the white point has to be prepared in advance. That is, much information should be prepared in advance so as to extract a color region. Thus, it is not easy to extract a color region of a specific color regardless of a color temperature of a light source.

It is desirable to provide an image processing device, an image processing method, and a program by which a color region of a specific color can be correctly and easily extracted.

According to an embodiment of the present technology, there is provided an image processing device including a color temperature estimating unit configured to estimate a color temperature of a light source in imaging, a white balance adjusting unit configured to perform first white balance adjustment in which white balance of an image signal is adjusted on the basis of the estimated color temperature when the estimated color temperature is within a predetermined color temperature range and second white balance adjustment in which the white balance of the image signal is adjusted on the basis of the estimated color temperature even when the estimated color temperature is not within the predetermined color temperature range, and a color region extracting unit configured to extract a color region of a specific color by using the image signal to which the second white balance adjustment is applied.

In the embodiment of the present technology, a color temperature of a light source in imaging is estimated. The color temperature is estimated based on an image signal of a picked-up image or by using a color temperature sensor or the like, for example. In the first white balance adjustment, the white balance of the image signal is adjusted on the basis of the estimated color temperature when the estimated color temperature is within a predetermined color temperature range. Further, in the second white balance adjustment, the white balance of the image signal is adjusted on the basis of the estimated color temperature even when the estimated color temperature is not within the predetermined color temperature range. By using the image signal to which the second white balance adjustment is applied, extraction of a color region of a specific color is performed. With respect to the extracted color region or a region other than the extracted color region, for example, image adjustment that is adjustment of at least one of luminance, saturation, and sharpness is performed by using the image signal of which the white balance is adjusted, on the basis of the extraction result of a color region. As the image signal of which the white balance is adjusted, an image signal to which the first white balance adjustment is applied is used, for example. Further, a specific color of a region to be extracted is set in accordance with a user operation.

According to another embodiment of the present technology, there is provided an image processing method including estimating a color temperature of a light source in imaging, performing first white balance adjustment in which white balance of an image signal is adjusted on the basis of the estimated color temperature when the estimated color temperature is within a predetermined color temperature range and second white balance adjustment in which the white balance of the image signal is adjusted on the basis of the estimated color temperature even when the estimated color temperature is not within the predetermined color temperature range, and extracting a color region of a specific color by using the image signal to which the second white balance adjustment is applied.

According to still another embodiment of the present technology, there is provided a program that makes a computer execute image processing including performing first white balance adjustment in which white balance of an image signal is adjusted on the basis of a color temperature when the color temperature of a light source in imaging is within a predetermined color temperature range and second white balance adjustment in which the white balance of the image signal is adjusted on the basis of the color temperature even when the color temperature is not within the predetermined color temperature range, and extracting a color region of a specific color by using the image signal to which the second white balance adjustment is applied.

The program according to the still other embodiment is a program that can be provided to a general-purpose computer system which can execute various program codes, for example, by a recording medium such as an optical disk, a magnetic disk, and a semiconductor memory or a communication medium such as a network, in a computer-readable manner. By providing such program in a computer readable manner, processing corresponding to the program is realized on the computer system.

According to the embodiments of the present technology, a color temperature of a light source in imaging is estimated. When the estimated color temperature is within a predetermined color temperature range, the first white balance adjustment in which white balance of an image signal is adjusted on the basis of the estimated color temperature is performed. Even when the estimated color temperature is not within the predetermined color temperature range, the second white balance adjustment in which the white balance of the image signal is adjusted on the basis of the estimated color temperature is performed. Further, extraction of a color region of a specific color is performed by using the image signal to which the second white balance adjustment is applied. Thus, extraction of a color region of a specific color is performed by using an image signal to which the second white balance adjustment is applied, so that a color region of a specific color can be correctly and easily extracted regardless of a color temperature of a light source, without preliminarily preparing changing information showing how a threshold value is changed on the basis of color temperature information or a threshold value and the like of each color temperature.

BRIEF DESCRIPTION OF THE DRAWINGS

FIG. 6 is a flowchart showing an operation according to another embodiment; and

DETAILED DESCRIPTION OF EMBODIMENTS

Embodiments of the present technology will be described below. The description is given in the following order.
1. Configuration of Imaging Apparatus
2. Operation According to An Embodiment
3. Operation According to Another Embodiment
<1. Configuration of Imaging Apparatus>

Figure 1:
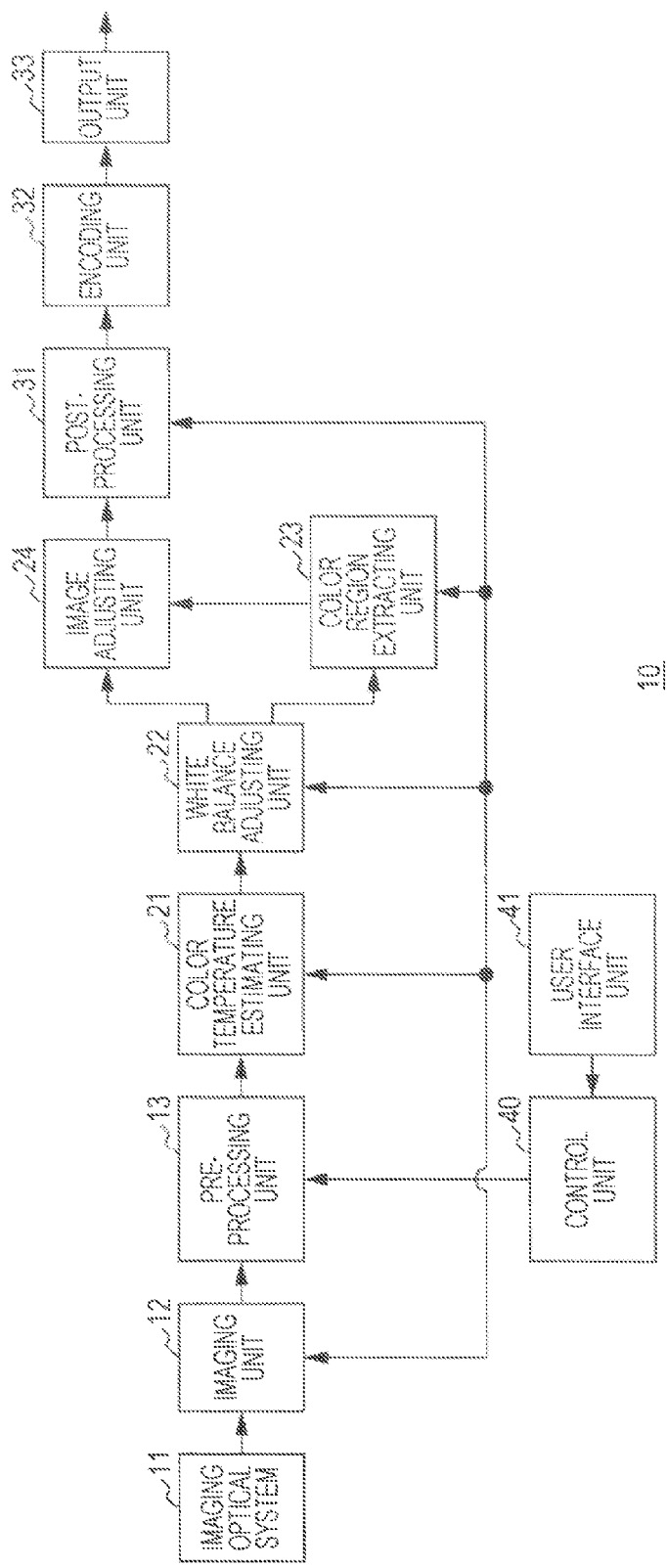
FIG. 1 illustrates the configuration of an imaging apparatus.

FIG. 1 illustrates the configuration of an imaging apparatus using an image processing device according to embodiments of the present technology. This imaging apparatus 10 includes an imaging optical system 11, an imaging unit 12, a pre-processing unit 13, a color temperature estimating unit 21, a white balance adjusting unit 22, a color region extracting unit 23, an image adjusting unit 24, a post-processing unit 31, an encoding unit 32, an output unit 33, a control unit 40, and a user interface unit 41. Here, the color temperature estimating unit 21, the white balance adjusting unit 22, the color region extracting unit 23, and the image adjusting unit 24 constitute the image processing device according to the embodiments of the present technology.

The imaging optical system 11 is mainly composed of a lens and forms an optical image of a subject, which is not shown, on a light-receiving surface of the imaging unit 12.

The imaging unit 12 is composed of a solid-state imaging element such as a complementary metal-oxide semiconductor (CMOS) and a charge coupled device (CCD). The imaging unit 12 generates an imaging signal corresponding to the optical image which is formed on the light-receiving surface by the imaging optical system 11 and outputs the imaging signal to the pre-processing unit 13.

The pre-processing unit 13 applies correlated double sampling (CDS), analog amplifying processing, A/D converting processing, and the like to the imaging signal which is supplied from the imaging unit 12 and outputs the imaging signal to the color temperature estimating unit 21.

The color temperature estimating unit 21 performs signal component detection for white balance control by using the imaging signal supplied from the pre-processing unit 13 so as to estimate a color temperature of a light source in picked-up image generation, on the basis of the detection result. The color temperature estimating unit 21 may estimate a color temperature of the light source in the picked-up image generation not only by using the imaging signal but also by using a color temperature sensor, for example.

The white balance adjusting unit 22 sets a white balance gain on the basis of the color temperature which is estimated in the color temperature estimating unit 21 and adjusts a signal level of each color signal by the white balance gain which is set. Thus, the white balance adjusting unit 22 performs white balance adjustment. Further, in a case where the estimated color temperature is within a predetermined color temperature range, the white balance adjusting unit 22 performs first white balance adjustment by which white balance is allowed to follow the estimated color temperature. Furthermore, not only in a case where the estimated color temperature is within the predetermined color temperature range but also in a case where the estimated color temperature is not within the color temperature range, the white balance adjusting unit 22 performs second white balance adjustment by which white balance is allowed to follow the estimated color temperature. The white balance adjusting unit 22 outputs an image signal, to which the second white balance adjustment is applied, to the color region extracting unit 23. Further, the white balance adjusting unit 22 outputs the image signal to which the first white balance adjustment is applied or the image signal to which the second white balance adjustment is applied, to the image adjusting unit 24. Here, when a color region of a specific color is extracted in the color region extracting unit 23, the white balance adjusting unit 22 may perform the second white balance adjustment.

The color region extracting unit 23 extracts a color region of a specific color in a picked-up image by using the image signal to which the second white balance adjustment is applied, so as to output an extraction result to the image adjusting unit 24.

The image adjusting unit 24 performs image adjustment based on the extraction result of the color region, with respect to the image signal to which the white balance adjustment is applied. The image adjusting unit 24 adjusts at least one of saturation, luminance, and sharpness of the extracted color region or a color region other than the extracted color region, on the basis of the extraction result of the color region, for example. The image adjusting unit 24 outputs the image signal after the image adjustment to the post-processing unit 31. The image adjusting unit 24 may perform not only the adjustment of at least one of saturation, luminance, and sharpness but also other image adjustment.

The post-processing unit 31 performs post-processing by using the image signal which is outputted from the image adjusting unit 24. The post-processing unit 31 performs post-processing such as resizing processing by which a size of a picked-up image is changed, a rotating processing by which a direction of the picked-up image is changed, and reversing processing of the picked-up image. The post-processing unit 31 outputs the image signal after the post-processing to the encoding unit 32.

The encoding unit 32 compresses and encodes the image signal which is supplied from the post-processing unit 31 so as to generate encoded data having a predetermined format.

For example, the encoding unit 32 performs compression encoding by using a format such as JPEG and MPEG so as to generate encoded data and output the encoded data to the output unit 33.

The output unit 33 performs processing of outputting the encoded data which is supplied from the encoding unit 32 to the outside. The output unit 33 performs processing of supplying the encoded data to an external device or processing of recording the encoded data in a storage medium, for example.

To the control unit 40, the user interface (I/F) unit 41 is connected. The user interface unit 41 receives an operation input from a user and includes a power source switch, various operation keys such as a shutter key and a zoom key, operation keys for performing menu display, selection of a menu item, or various setting, and the like. Further, in the user interface unit 41, an operation for designating a specific color of a color region which is extracted in the color region extracting unit 23, an operation for designating how an image is adjusted in the image adjusting unit 24, an operation for designating how post-processing is performed in the post-processing unit 31, and the like are performed. The user interface unit 41 outputs an operation signal corresponding to a user operation to the control unit 40.

The control unit 40 is composed of a micro computer and the like. The control unit 40 executes a stored program and controls each unit on the basis of the operation signal so as to make an operation of the imaging apparatus 10 correspond to a user operation.

<2. Operation According to An Embodiment>

Figure 2:
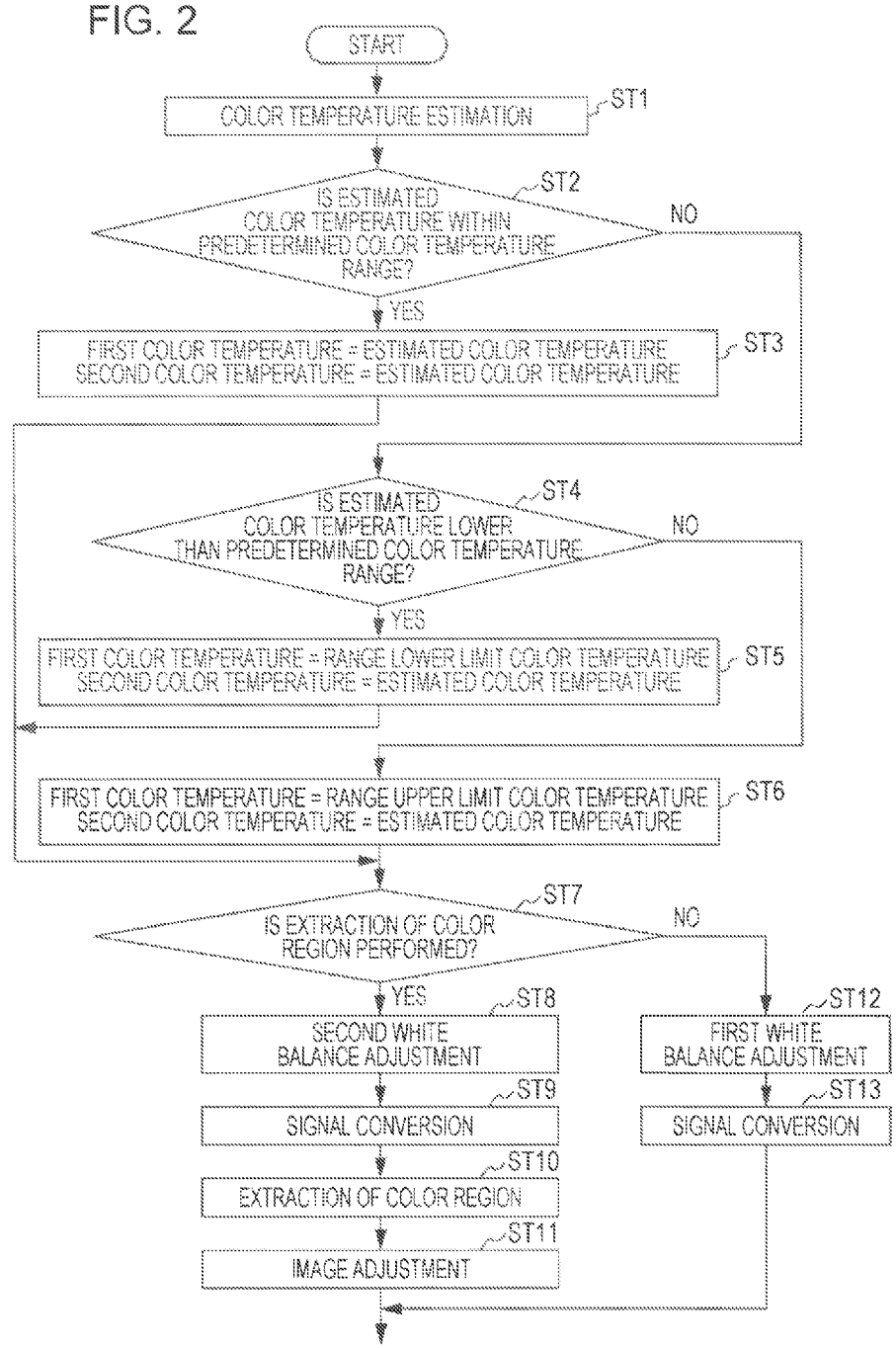
FIG. 2 is a flowchart showing an operation according to an embodiment.

FIG. 2 is a flowchart illustrating an operation of the image processing device according to an embodiment. In step ST1, the color temperature estimating unit 21 performs color temperature estimation. The color temperature estimating unit 21 estimates a color temperature of a light source in picked-up image generation and goes to step ST2.

In step ST2, the white balance adjusting unit 22 determines whether the estimated color temperature is within a predetermined color temperature range. When the estimated color temperature is within the predetermined color temperature range, the white balance adjusting unit 22 goes to step ST3. When the estimated color temperature is not within the predetermined color temperature range, that is, when the estimated color temperature is lower or higher than the predetermined color temperature range, the white balance adjusting unit 22 goes to step ST4.

In step ST3, the white balance adjusting unit 22 sets the estimated color temperature as a first color temperature and a second color temperature and goes to step ST7. Here, the first color temperature is set to a color temperature, which is used when the first white balance adjustment is performed, of a light source in picked-up image generation. The second color temperature is set to a color temperature, which is used when the second white balance adjustment is performed, of the light source in picked-up image generation. The first color temperature and the second color temperature have the same estimated values.

In step ST4, the white balance adjusting unit 22 determines whether the estimated color temperature is lower than the predetermined color temperature range. When the estimated color temperature is lower than the predetermined color temperature range, the white balance adjusting unit 22 goes to step ST5. When the estimated color temperature is higher than the predetermined color temperature range, the white balance adjusting unit 22 goes to step ST6.

Figure 3:
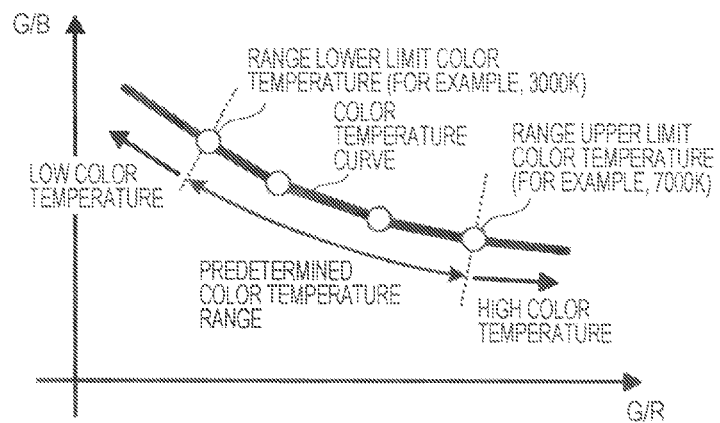
FIG. 3 illustrates a predetermined color temperature range.

In step ST5, the white balance adjusting unit 22 sets a range lower limit color temperature and the estimated color temperature to a first color temperature and a second color temperature respectively and goes to step ST7. Here, the range lower limit color temperature is a color temperature showing a lower limit of a predetermined color temperature range as shown in FIG. 3.

In step ST6, the white balance adjusting unit 22 sets a range upper limit color temperature and the estimated color temperature to a first color temperature and a second color temperature respectively and goes to step ST7. The range upper limit color temperature is a color temperature showing an upper limit of a predetermined color temperature range as shown in FIG. 3.

In step ST7, the white balance adjusting unit 22 determines whether extraction of a color region is performed. When the color region extracting unit 23 is set to extract a color region of a specific color, the white balance adjusting unit 22 goes to step ST8, and when the color region extracting unit 23 is not set to extract a color region, the white balance adjusting unit 22 goes to step ST12.

In step ST8, the white balance adjusting unit 22 performs the second white balance adjustment. When a color temperature of a light source in picked-up image generation is the second color temperature, the white balance adjusting unit 22 performs the second white balance adjustment by setting a white balance gain and adjusting a signal level of each color signal. Then, the white balance adjusting unit 22 goes to step ST9.

In step ST9, the white balance adjusting unit 22 performs signal conversion. When white balance adjustment is performed by using image signals of three primary colors, for example, the white balance adjusting unit 22 converts the image signals, to which the white balance adjustment is applied, of three primary colors into a luminance signal and a color difference signal. Then, the white balance adjusting unit 22 goes to step ST10. Here, the signal conversion in step ST9 is processing provided when a signal system of an image signal which is outputted from the white balance adjusting unit 22 and a signal system of an image signal which is used when a color region of a specific color is extracted in the color region extracting unit 23 are different from each other. Accordingly, when the signal system of the image signal which is outputted from the white balance adjusting unit 22 and the signal system of the image signal which is used when a color region of a specific color is extracted in the color region extracting unit 23 are equal to each other, it is not necessary to provide the processing of step ST9. When a color region is extracted by using image signals, to which the white balance adjustment is applied, of three primary colors, for example, or when the white balance adjustment is performed by using a luminance signal and a color difference signal, the signal conversion of step ST9 is not necessary.

Figure 4:
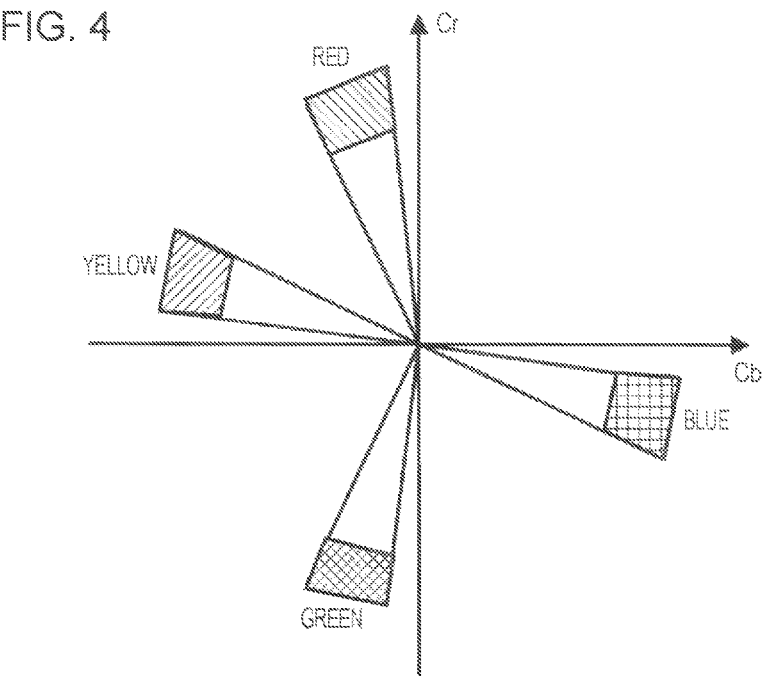
FIG. 4 illustrates a color determination standard when color difference signals Cb and Cr are used.

In step ST10, the color region extracting unit 23 extracts a color region. The color region extracting unit 23 extracts a color region of a specific color in a picked-up image by using the image signal to which the second white balance adjustment is applied, and goes to step ST11. Here, the image signal used in the color region extracting unit 23 is an image signal to which the second white balance adjustment is applied, that is, an image signal to which white balance adjustment is correctly applied even when the estimated color temperature is not within the predetermined color temperature range, namely, an image signal to which white balance adjustment is applied in accordance with the estimated color temperature. Accordingly, the color region extracting unit 23 can correctly extract a color region of a specific color by comparing the image signal to which the second white balance adjustment is applied with a color determination standard of a predetermined specific color. FIG. 4 illustrates a color determination standard when color difference signals Cb and Cr are used. It is set that a specific color can be switched and when a user selects "blue" as a specific color, for example, the color region extracting unit 23 extracts a region of the image in which the color difference signals Cb and Cr are in a range of "blue". When a user selects "yellow" as the specific color, for example, the color region extracting unit 23 extracts a region of an image in which the color difference signals Cb and Cr are in a range of "yellow". Further, a color determination standard of flesh color, which is not shown, may be set and regions of a face, a hand, and the like of a person may be automatically extracted. Since an image signal to which the second white balance adjustment is applied is used, it is not necessary to provide a color determination standard for each color temperature and a color region of a specific color can be easily extracted.

Figure 5A:
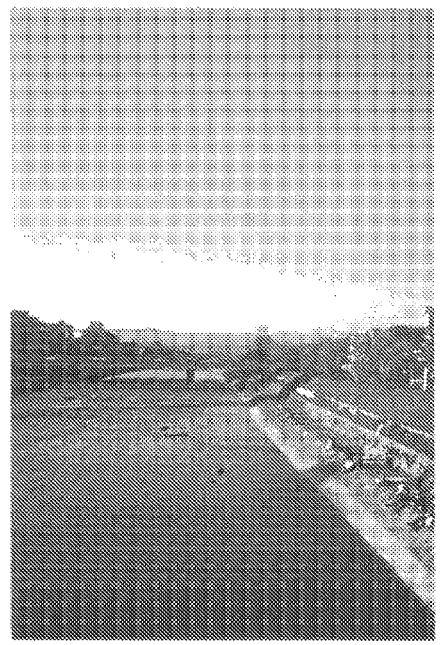
FIGS. 5A and 5B illustrate an image adjustment operation.
Figure 5B:
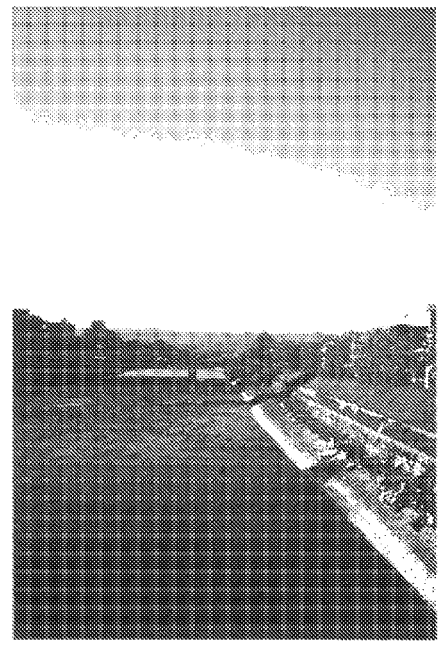

In step ST11, the image adjusting unit 24 performs image adjustment. The image adjusting unit 24 performs adjustment with respect to an extracted color region or a color region other than the extracted color region on the basis of the extraction result of the color region. When the image adjusting unit 24 lowers saturation of the region other than the extracted color region to make the other region have an achromatic color, for example, an image of so-called partial color can be generated. By adjusting luminance of the extracted color region to increase contrast, a picked-up image which seems to be taken by using a polarizing filter as shown in FIG. 5B can be generated from a picked-up image shown in FIG. 5A. Further, not only luminance or saturation but also sharpness may be adjusted. For example, by performing processing for lowering sharpness of a region other than an extracted color region, a picked-up image of which a subject in a color region of a specific color is focused can be generated. Here, different adjustment can be performed with respect to an extracted color region and a region other than the extracted color region.

When it is determined that extraction of a color region is not performed in step ST7 and the process goes to step ST12, the white balance adjusting unit 22 performs the first white balance adjustment. When a color temperature of a light source in picked-up image generation is the first color temperature, the white balance adjusting unit 22 performs the first white balance adjustment by setting a white balance gain and adjusting a signal level of each color signal. Then, the white balance adjusting unit 22 goes to step ST13. That is, in the first white balance adjustment, when the estimated color temperature is within a predetermined color temperature range, the white balance adjustment is performed in accordance with the color temperature. Further, in the first white balance adjustment, when the estimated color temperature is lower than the predetermined color temperature range, the white balance adjustment is performed under the condition that the color temperature is a range lower limit color temperature. Furthermore, in the first white balance adjustment, when the estimated color temperature is higher than the predetermined color temperature range, the white balance adjustment is performed under the condition that the color temperature is a range upper limit color temperature. Accordingly, when the estimated color temperature is not within the predetermined color temperature range, an image based on an image signal to which the first white balance adjustment is applied becomes an image having an atmosphere of the light source.

In step ST13, the white balance adjusting unit 22 performs signal conversion. When white balance adjustment is performed by using image signals of three primary colors, for example, the white balance adjusting unit 22 converts the image signals, to which the white balance adjustment is applied, of three primary colors into a luminance signal and a color difference signal. Here, the signal conversion in step ST13 is processing provided when a signal system of an image signal which is outputted from the white balance adjusting unit 22 and a signal system of an image signal which is used in post-processing of the post-processing unit 31 are different from each other. Accordingly, when the signal system of the image signal which is outputted from the white balance adjusting unit 22 and the signal system of the image signal which is used in the post-processing of the post-processing unit 31 are equal to each other, it is not necessary to provide the processing of step ST13.

Thus, the color region extracting unit 23 extracts a color region by using an image signal to which the second white balance adjustment is applied. That is, even when an estimated color temperature is not within a predetermined color temperature range, white balance adjustment is performed in accordance with the estimated color temperature and a color region is extracted by using the image signal to which the white balance adjustment is applied. Accordingly, a color region of a specific color can be correctly and easily extracted regardless of a color temperature of a light source, without preliminarily preparing changing information showing how a threshold value is changed based on color temperature information or a threshold value and the like of each color temperature.

Further, by performing image adjustment with respect to an image signal, to which the second white balance adjustment is applied, in accordance with a determination result of a color region of a specific color, a processing result of image adjustment can be confirmed by an image of which white balance is adjusted in accordance with an estimated color temperature.

Here, when extraction of a color region is not performed, the first white balance adjustment is performed, so that when an estimated color temperature is lower or higher than a predetermined color temperature range, an image which has a color of a light source can be generated.

<3. Operation According to Another Embodiment>

In the operation according to the above-described embodiment, image adjustment is performed with respect to an image signal to which the second white balance adjustment is applied, based on a determination result of a color region. However, if image adjustment is performed with respect to an image signal, to which the first white balance adjustment is applied, based on a determination result of a color region, an image which is obtained such that image adjustment is performed with respect to an image having an atmosphere of a light source in accordance with a determination result of a color region of a specific color can be generated. In another embodiment below, a case where image adjustment is performed with respect to an image signal to which the first white balance adjustment is applied, on the basis of a determination result of a color region will be described.

FIG. 6 is a flowchart illustrating an operation of the image processing device according to the other embodiment. In step ST21, the color temperature estimating unit 21 performs color temperature estimation. The color temperature estimating unit 21 estimates a color temperature of a light source in picked-up image generation and goes to step ST22.

In step ST22, the white balance adjusting unit 22 determines whether the estimated color temperature is within a predetermined color temperature range. When the estimated color temperature is within the predetermined color temperature range, the white balance adjusting unit 22 goes to step ST23. When the estimated color temperature is not within the predetermined color temperature range, that is, when the estimated color temperature is lower or higher than the predetermined color temperature range, the white balance adjusting unit 22 goes to step ST24.

In step ST23, the white balance adjusting unit 22 sets the estimated color temperature as a first color temperature and a second color temperature and goes to step ST27. The first color temperature is set to a color temperature, which is used when the first white balance adjustment is performed, of a light source in picked-up image generation. The second color temperature is set to a color temperature, which is used when the second white balance adjustment is performed, of the light source in picked-up image generation. The first color temperature and the second color temperature have the same estimated values.

In step ST24, the white balance adjusting unit 22 determines whether the estimated color temperature is lower than the predetermined color temperature range. When the estimated color temperature is lower than the predetermined color temperature range, the white balance adjusting unit 22 goes to step ST25. When the estimated color temperature is higher than the predetermined color temperature range, the white balance adjusting unit 22 goes to step ST26.

In step ST25, the white balance adjusting unit 22 sets a range lower limit color temperature and the estimated color temperature to a first color temperature and a second color temperature respectively and goes to step ST27. The range lower limit color temperature is a color temperature showing a lower limit of a predetermined color temperature range.

In step ST26, the white balance adjusting unit 22 sets a range upper limit color temperature and the estimated color temperature to a first color temperature and a second color temperature respectively and goes to step ST27. The range upper limit color temperature is a color temperature showing an upper limit of a predetermined color temperature range.

In step ST27, the white balance adjusting unit 22 determines whether extraction of a color region is performed. When the color region extracting unit 23 is set to extract a color region of a specific color, the white balance adjusting unit 22 goes to step ST28, and when the color region extracting unit 23 is not set to extract a color region, the white balance adjusting unit 22 goes to step ST34.

In step ST28, the white balance adjusting unit 22 performs the second white balance adjustment. When a color temperature of a light source in picked-up image generation is the second color temperature, the white balance adjusting unit 22 performs the second white balance adjustment by setting a white balance gain and adjusting a signal level of each color signal. Then, the white balance adjusting unit 22 goes to step ST29.

In step ST29, the white balance adjusting unit 22 performs signal conversion. When white balance adjustment is performed by using image signals of three primary colors, for example, the white balance adjusting unit 22 converts the image signals, to which the white balance adjustment is applied, of three primary colors into a luminance signal and a color difference signal. Then, the white balance adjusting unit 22 goes to step ST30. Here, when a signal system of an image signal which is outputted from the white balance adjusting unit 22 and a signal system of an image signal which is used when a color region of a specific color is extracted in the color region extracting unit 23 are equal to each other, it is not necessary to provide the processing of step ST29.

In step ST30, the color region extracting unit 23 extracts a color region. The color region extracting unit 23 extracts a color region of a specific color in a picked-up image by using the image signal to which the second white balance adjustment is applied and goes to step ST31. Here, the image signal used in the color region extracting unit 23 is an image signal to which the second white balance adjustment is applied, that is, an image signal to which white balance adjustment is correctly applied even when the estimated color temperature exceeds a follow-up setting range, namely, an image signal to which white balance adjustment is applied in accordance with the estimated color temperature. Accordingly, the color region extracting unit 23 can correctly extract a color region of a specific color by using the image signal to which the second white balance adjustment is applied.

In step ST31, the white balance adjusting unit 22 performs the first white balance adjustment. When a color temperature of a light source in picked-up image generation is the first color temperature, the white balance adjusting unit 22 performs the first white balance adjustment by setting a white balance gain and adjusting a signal level of each color signal. Then, the white balance adjusting unit 22 goes to step ST32.

In step ST32, the white balance adjusting unit 22 performs signal conversion. When image signals of three primary colors are supplied from the white balance adjusting unit 22, for example, the white balance adjusting unit 22 converts the image signals of three primary colors into a luminance signal and a color difference signal and goes to step ST33. Here, the signal conversion in step ST32 is processing provided when a signal system of an image signal which is outputted from the white balance adjusting unit 22 and a signal system of an image signal which is used in image adjustment in the image adjusting unit 24 are different from each other. Accordingly, when the signal system of the image signal which is outputted from the white balance adjusting unit 22 and the signal system of the image signal which is used in the image adjustment in the image adjusting unit 24 are equal to each other, it is not necessary to provide the processing of step ST32.

In step ST33, the image adjusting unit 24 performs image adjustment. The image adjusting unit 24 performs adjustment of an image signal, to which the first white balance adjustment is applied, with respect to an extracted color region or a color region other than the extracted color region on the basis of the extraction result of a color region. The image adjusting unit 24 adjusts saturation, luminance, sharpness, and the like as described above.

When it is determined that extraction of a color region is not performed in step ST27 and the process goes to step ST34, the white balance adjusting unit 22 performs the first white balance adjustment. When a color temperature of a light source in picked-up image generation is the first color temperature, the white balance adjusting unit 22 performs the first white balance adjustment by setting a white balance gain and adjusting a signal level of each color signal. Then, the white balance adjusting unit 22 goes to step ST35.

In step ST35, the white balance adjusting unit 22 performs signal conversion. When white balance adjustment is performed by using image signals of three primary colors, for example, the white balance adjusting unit 22 converts the image signals, to which the white balance adjustment is applied, of three primary colors into a luminance signal and a color difference signal. Here, the signal conversion in step ST35 is processing provided when a signal system of an image signal which is outputted from the white balance adjusting unit 22 and a signal system of an image signal which is used in post-processing in the post-processing unit 31 are different from each other. Accordingly, when the signal system of the image signal which is outputted from the white balance adjusting unit 22 and the signal system of the image signal which is used in the post-processing in the post-processing unit 31 are equal to each other, it is not necessary to provide the processing of step ST35.

Thus, the color region extracting unit 23 extracts a color region by using an image signal to which the second white balance adjustment is applied. Accordingly, the color region extracting unit 23 can correctly and easily extract a color region of a specific color regardless of a color temperature of a light source without preliminarily preparing changing information showing how a threshold value is changed based on color temperature information or a threshold value of each color temperature.

Further, when extraction of a color region is performed, image adjustment is performed with respect to an image signal to which the first white balance adjustment is applied, on the basis of a color region extraction result. Accordingly, an image which is obtained such that image adjustment is performed with respect to an image having an atmosphere of a photographing light source in accordance with a determination result of a color region of a specific color can be generated.

Figure 7C:
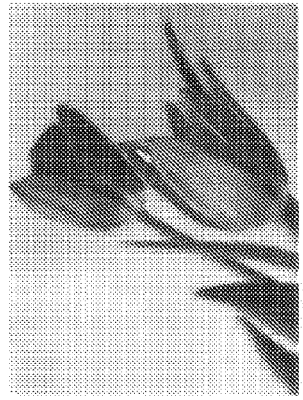
FIGS. 7A to 7E illustrate the operation of the second embodiment.
Figure 7E:
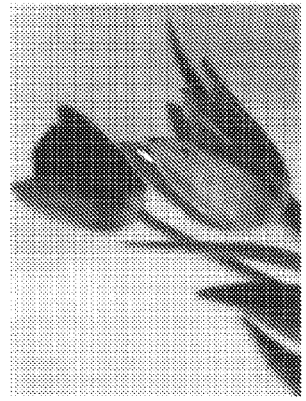
Figure 7B:
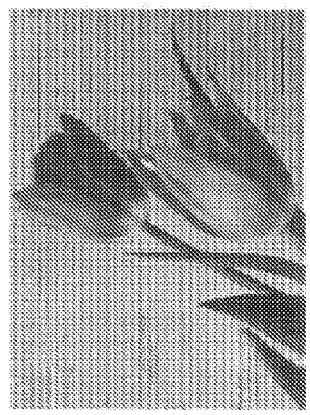
Figure 7D:
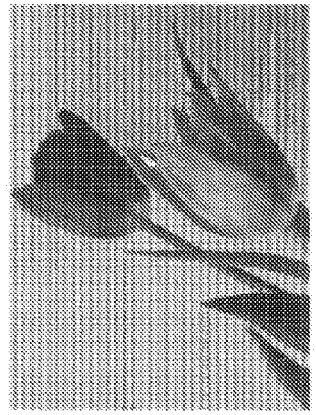
Figure 7A:
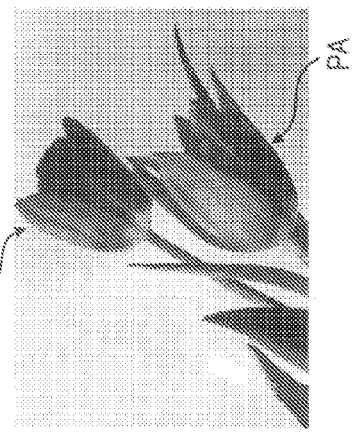

FIGS. 7A to 7E illustrate the operation according to the other embodiment. FIG. 7A illustrates a picked-up image which includes a front flower PA and a back flower PB as subjects, for example. Here, it is assumed that the front flower PA has a specific color. Further, it is assumed that the back flower PB has a color different from the specific color on an image to which white balance adjustment is correctly applied, and has a color similar to the specific color on an image to which white balance adjustment following a color temperature of a light source is not applied because the color temperature of the light source is lower than a lower limit color temperature.

In this case, when a color region of the specific color is extracted by using an image signal to which white balance adjustment following the color temperature of the light source is not applied because the color temperature of the light source is lower than the lower limit color temperature, the front flower having the specific color and the back flower are erroneously determined as color regions of the specific color as shown in FIG. 7B. Here, a region which is not the color region of the specific color is shown by a striped pattern.

Therefore, when partial color processing is performed so as to make saturation in part other than the color region of the specific color achromatic or when sharpness of part other than the color region of the specific color is lowered so as to emphasize the color region of the specific color, the back flower which does not have the specific color is also emphasized as shown in FIG. 7C.

However, in the embodiment of the present technology, a color region of a specific color is extracted by using an image signal to which white balance adjustment is applied based on a color temperature of a light source, even when the color temperature of the light source in imaging is lower than a lower limit color temperature. Accordingly, only the front flower having the specific color is determined as a color region of the specific color as shown in FIG. 7D, and only the front flower can be displayed in an emphasized manner as shown in FIG. 7E.

Further, image adjustment is performed with respect to an image signal, to which the first white balance adjustment is applied, on the basis of a color extraction result. Therefore, an image after the image adjustment is an image which is obtained such that the image adjustment is performed with respect to an image having an atmosphere of a light source in accordance with a determination result of a color region of a specific color.

When extraction of a color region is not performed, the first white balance adjustment is performed. Therefore, an image having a color of a light source can be generated when an estimated color temperature is lower or higher than a predetermined color temperature range.

The series of the processing described in this specification may be performed by hardware, software, or compound configuration of hardware and software. In a case where the processing is performed by software, a program in which processing sequence is recorded is installed on a memory in a computer which is incorporated in dedicated hardware, so as to be performed. Alternatively, the program can be installed on a general-purpose computer which is capable of performing various processing, so as to be performed.

For example, the program can be preliminarily recorded in hard disk or a read only memory (ROM) serving as a recording medium. Alternatively, the program can be temporarily or permanently stored (recorded) in a removable recording medium such as a flexible disc, a compact disc read only memory (CD-ROM), a magneto optical (MO) disc, a digital versatile disc (DVD), a magnetic disc, and a semiconductor memory card. Such removable recording medium can be provided as so-called packaged software.

Further, the program can be not only installed on a computer from a removable recording medium but also transferred to the computer in a wireless or wired fashion from a download site through a network such as a local area network (LAN) and the Internet. The computer can receive the program transferred in such manner and install the program into a recording medium such as built-in hard disk.

It should be noted that the present technology is not interpreted limitedly to the embodiments described above. The embodiments disclose the present technology in the state of exemplification. The embodiments are not limited to the case where a color region is extracted by using the color difference signals Cb and Cr as shown in FIG. 4 under the condition that one of "blue", "red", "yellow", and "green" is set to a specific color, for example. Extraction of a color region by using image signals of three primary colors or extraction of a color region under the condition that other color is set to a specific color, for example, may be performed. It is apparent that those skilled in the art can modify or substitute the embodiments within the scope of the present technology. That is, the substance of the present technology should be judged according to the embodiments of the present technology.

The present disclosure contains subject matter related to that disclosed in Japanese Priority Patent Application JP 2011-041725 filed in the Japan Patent Office on Feb. 28, 2011, the entire contents of which are hereby incorporated by reference.

What is claimed is:

1. An image processing device, comprising:
    circuitry configured to estimate a color temperature of a light source in imaging;
    circuitry configured to determine whether to perform first white balance adjustment in which white balance of an image signal is adjusted on the basis of the estimated color temperature when the estimated color temperature is within a predetermined color temperature range, or whether to perform second white balance adjustment, different from the first white balance adjustment, the white balance of the image signal in the second white balance adjustment being adjusted on the basis of the estimated color temperature when the estimated color temperature is within and not within the predetermined color temperature range; and
    circuitry configured to extract a color region of a specific color from the image signal to which the second white balance adjustment is applied.

2. The image processing device according to claim 1, wherein the image processing device further comprises circuitry configured to perform image adjustment on the basis of an extraction result of the color region, by using the image signal of which the white balance is adjusted.

3. The image processing device according to claim 2, wherein the image processing device further comprises circuitry that performs the image adjustment with respect to the image signal to which the first white balance adjustment is applied.

4. The image processing device according to claim 2, wherein the circuitry configured to perform image adjustment performs adjustment of sharpness with respect to at least one of an extracted color region and a region other than the extracted color region in the image signal, on the basis of an extraction result of the color region.

5. The image processing device according to claim 1, wherein the circuitry configured to extract the color region performs extraction of the color region by comparing the image signal to which the second white balance adjustment is applied and a color determination standard that is preliminarily set for every specific color without depending on the color temperature.

6. The image processing device according to claim 1, wherein the circuitry configured to extract the color region is capable of switching the specific color.

7. The image processing device according to claim 1, wherein the circuitry configured to determine whether to perform first white balance adjustment performs the first white balance adjustment when extraction of a color region is not performed.

8. An image processing method, comprising:
estimating a color temperature of a light source in imaging;
determining whether to perform first white balance adjustment in which white balance of an image signal is adjusted on the basis of the estimated color temperature when the estimated color temperature is within a predetermined color temperature range or whether to perform second white balance adjustment, different from the first white balance adjustment, the white balance of the image signal in the second white balance adjustment being adjusted on the basis of the estimated color temperature when the estimated color temperature is within and not within the predetermined color temperature range; and
extracting a color region of a specific color from the image signal to which the second white balance adjustment is applied.

9. A non-transitory computer-readable storage medium storing computer-readable instructions thereon which, when executed by a computer, cause the computer to perform a method comprising:
determining whether to perform first white balance adjustment in which white balance of an image signal is adjusted on the basis of a color temperature when the color temperature of a light source in imaging is within a predetermined color temperature range or whether to perform second white balance adjustment, different from the first white balance adjustment, the white balance of the image signal in the second white balance adjustment being adjusted on the basis of the color temperature when the color temperature is within and not within the predetermined color temperature range; and
extracting a color region of a specific color from the image signal to which the second white balance adjustment is applied.

10. The image processing device according to claim 2, wherein the image processing device includes circuitry that lowers saturation with respect to at least one of the extracted color region and a region other than the extracted color region in the image signal, on the basis of an extraction result of the color region.

11. The image processing method according to claim 8, further comprising performing image adjustment on the basis of an extraction result of the color region, by using the image signal of which the white balance is adjusted.

12. The image processing method according to claim 11, wherein the performing the image adjustment includes performing the image adjustment with respect to the image signal to which the first white balance adjustment is applied.

13. The image processing method according to claim 11, wherein the performing the image adjustment includes performing adjustment of at least one of luminance, saturation, and sharpness with respect to at least one of an extracted color region and a region other than the extracted color region in the image signal, on the basis of an extraction result of the color region.

14. The image processing method according to claim 8, wherein the extracting includes switching the specific color.

15. The image processing method according to claim 8, wherein the performing the first white balance adjustment includes performing the first white balance adjustment when extraction of a color region is not performed.

16. The image processing method according to claim 11, wherein the performing the image adjustment includes lowering saturation with respect to at least one of the extracted color region and a region other than the extracted color region in the image signal, on the basis of an extraction result of the color region.

17. The non-transitory computer-readable storage medium according to claim 9, further comprising performing image adjustment on the basis of an extraction result of the color region, by using the image signal of which the white balance is adjusted.

18. The non-transitory computer-readable storage medium according to claim 17, wherein the performing the image adjustment includes performing the image adjustment with respect to the image signal to which the first white balance adjustment is applied.

19. The non-transitory computer-readable storage medium according to claim 17, wherein the performing the image adjustment includes performing adjustment of at least one of luminance, saturation, and sharpness with respect to at least one of an extracted color region and a region other than the extracted color region in the image signal, on the basis of an extraction result of the color region.

20. The non-transitory computer-readable storage medium according to claim 9, wherein the extracting includes switching the specific color.

21. The non-transitory computer-readable storage medium according to claim 9, wherein the performing the first white balance adjustment includes performing the first white balance adjustment when extraction of a color region is not performed.

22. The non-transitory computer-readable storage medium according to claim 17, wherein the performing the image adjustment includes lowering saturation with respect to at least one of the extracted color region and a region other than the extracted color region in the image signal, on the basis of an extraction result of the color region.

23. The image processing device according to claim 2, wherein the circuitry configured to perform image adjustment performs adjustment of luminance with respect to at least one of an extracted color region and a region other than the extracted color region in the image signal, on the basis of an extraction result of the color region.

24. The image processing device according to claim 2, wherein the circuitry configured to perform image adjustment performs adjustment of saturation with respect to at least one of an extracted color region and a region other than the extracted color region in the image signal, on the basis of an extraction result of the color region.

25. The image processing device according to claim 1, wherein the circuitry configured to estimate the color temperature estimates the color temperature based on information other than the image signal to which one of the first white balance adjustment and the second white balance adjustment is applied.

26. The image processing device according to claim 1, wherein the circuitry configured to estimate the color temperature estimates the color temperature based on the image signal to which neither the first white balance adjustment nor the second white balance adjustment is applied.

* * * * *